United States Patent
Chen

(10) Patent No.: US 6,976,937 B2
(45) Date of Patent: Dec. 20, 2005

(54) INTEGRATED EXERCISE DETECTION DEVICE EMPLOYING SATELLITE POSITIONING SIGNAL AND EXERCISE SIGNAL

(76) Inventor: Yu-Yu Chen, 2Fl., No. 349, Wushing St., Shinyi Chiu, Taipei (TW) 110

( * ) Notice: Subject to any disclaimer, the term of this patent is extended or adjusted under 35 U.S.C. 154(b) by 0 days.

(21) Appl. No.: 10/790,748

(22) Filed: Mar. 3, 2004

(65) Prior Publication Data

US 2005/0197237 A1    Sep. 8, 2005

(51) Int. Cl.[7] .............................................. A63B 21/00
(52) U.S. Cl. ........................... 482/8; 342/352; 701/213
(58) Field of Search ........................ 482/1–9, 900–902; 342/350, 352–356, 357.01–357.09; 701/200, 701/201, 213

(56) References Cited

U.S. PATENT DOCUMENTS

| | | | |
|---|---|---|---|
| 6,148,262 A * | 11/2000 | Fry .............................. | 701/213 |
| 6,251,048 B1 * | 6/2001 | Kaufman ........................ | 482/8 |
| 6,285,314 B1 * | 9/2001 | Nagatsuma et al. ... | 342/357.08 |
| 6,336,891 B1 * | 1/2002 | Fedrigon et al. ............... | 482/8 |

* cited by examiner

Primary Examiner—Glenn E. Richman
(74) Attorney, Agent, or Firm—Rosenberg, Klein & Lee

(57) ABSTRACT

An integrated exercise detection device includes a satellite positioning module that receives satellite signals associated with a user. The satellite positioning module includes a microprocessor that processes the received satellite signals to generate first data including current position, displacement, velocity and altitude of the user. The integrated exercise detection device further includes an exercise detection module that detects exercise signals of the user and generates second data in response thereto. The second data are transmitted to the microprocessor via for example electrical cables and/or wireless transmission comprised of wireless transmitter coupled to the exercise detection module and wireless receiver coupled to the microprocessor. A display is electrically coupled to the second microprocessor to selectively display the first and second data.

10 Claims, 7 Drawing Sheets

INTEGRATED EXERCISE DETECTION DEVICE EMPLOYING SATELLITE POSITIONING SIGNAL AND EXERCISE SIGNAL

BACKGROUND OF THE INVENTION

1. Field of the Invention

The present invention relates generally to a device for detection conditions of outdoor exercises, and in particular to a device for detecting exercise conditions of bicycle riding by employing both satellite positioning signals received from satellites of a Global Positioning System (GPS) and exercise signals provided by sensors mounted on the bicycle/rider.

2. The Related Art

Exercises have been an important daily activity for modern urbanites. Exercise devices for both indoor and outdoor exercises are commonly available in the market. To ensure the result of exercise, some exercise devices are equipped with an exercise detection device that detects the exercise conditions and shows the detection result to the users. For example, a senor can be mounted on the pedal crank of a bicycle to detect and record the revolution and rotation speed of bicycle wheels. Independent detection devices are also available for detection of exercise conditions, such as a step counter that is attached to the body of a user to count the number of steps/strides that the user takes.

Most of the exercise detection devices are of single function designs. In other words, they detect only one particular kind of signal, such as signal of physical condition of a user or signal of motion of an exercising device, for example speed of a moving bicycle. Devices that receive two kinds of signal for detection of exercise conditions, to the best the inventor knows, are not available in the market.

Global positioning system (GPS) is well known for detecting the position of an object with the aids of radio frequency transmission from satellites. Satellite positioning signals obtained from GPS allows a user to know the position of an object at any particular time points and, based on the data of positions, the speed and moving distance can also be obtained. The GPS also provides data of altitude of the object in a global sense. Due to the fact that transmission of GPS signals between the satellite and a user may be interfered with by large objects that shield between the satellite and the user, GPS signals cannot actually reflect the exercise condition timely. In addition, taking bicycle riding as an example, the GPS provides only the information of displacement, speed and altitude of the bicycle and the rider. However, there is no way that a user of the GPS system can know information regarding pedaling of the rider, such as the pedaling speed (the rotational speed of the crank).

Thus, the present invention is aimed to provide an exercise detection device that employs signals from different sources for providing more precise condition of exercise to a user.

SUMMARY OF THE INVENTION

An object of the present invention is to provide an integrated exercise detection device that receives both satellite positioning signals from GPS satellites and exercise signals obtained from a person taking exercise with/without an exercise device whereby actual exercise conditions can be obtained by calibrating the signals with each other.

Another object of the present invention is to provide an exercise detection device comprising a satellite signal receiving/processing device that provides dynamic positional data and a device, such as velocity sensor, for detecting exercise conditions of a user, such as velocity, whereby both position and velocity, as well as other exercise conditions, can be provided timely.

A further object of the present invention is to provide an exercise detection device that is combined with a satellite signal receiving/processing device whereby geometrical data, such as position, altitude as well as displacement and velocity that can be inferred from the geometrical data, and exercising data, such as number of steps taken and speed, of an exerciser can be provided to a user simultaneously.

To achieve the above objects, in accordance with the present invention, there is provided an integrated exercise detection device comprising a satellite positioning module and an exercise detection module. The satellite positioning module receives satellite signals associated with a user, such as a person riding a bicycle. The satellite positioning module comprises a microprocessor that processes the received satellite signals to generate first data including current position, displacement, velocity and altitude of the user and a communication interface. The integrated exercise detection device further comprises an exercise detection module that detects exercise signals of the user and generates second data in response thereto. The second data are transmitted to the microprocessor via for example electrical cables and/or wireless transmission comprised of wireless transmitter coupled to the exercise detection module and wireless receiver coupled to the microprocessor. A display is electrically coupled to the second microprocessor to selectively display the first and second data.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF PREFERRED EMBODIMENTS

Figure 1:
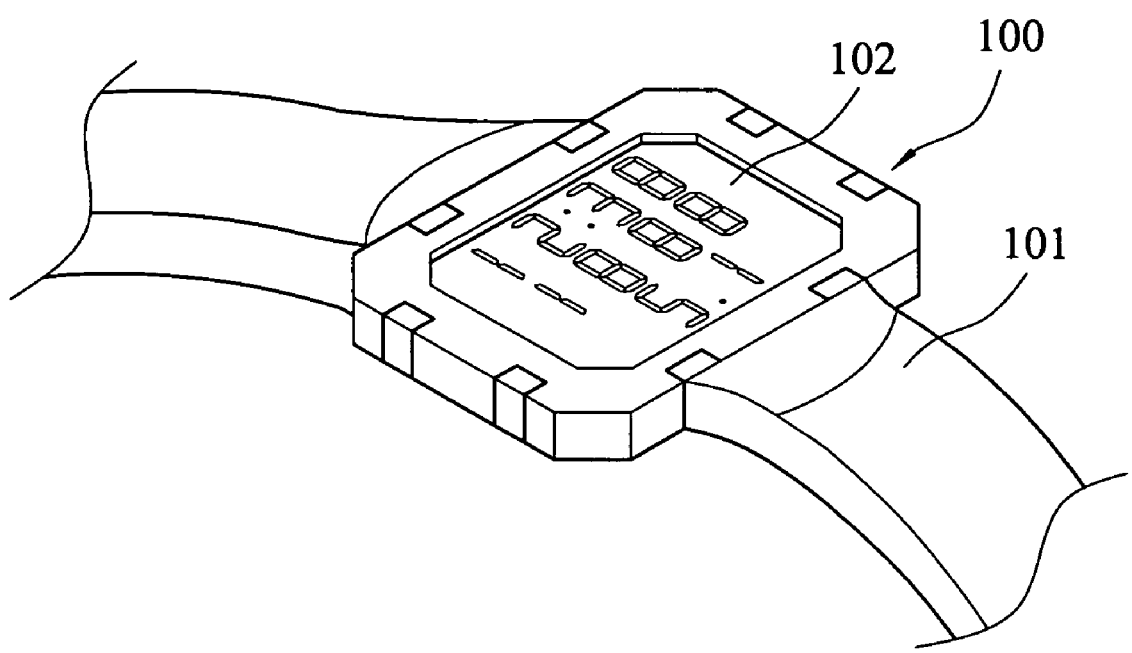
FIG. 1 is a perspective view of an integrated exercise detection device constructed in accordance with the present invention.

With reference to the drawings and in particular to FIG. 1, an integrated exercise detection device constructed in accordance with the present invention, generally designated with reference numeral 100, is made in the form that can be worn on the body of a user, comprising a display device 102 connected to and retained by strips 101 on opposite sides thereof. The display device 102 may display information or data regarding time, step counts, velocity or speed, current position, displacement and altitude.

Figure 2:
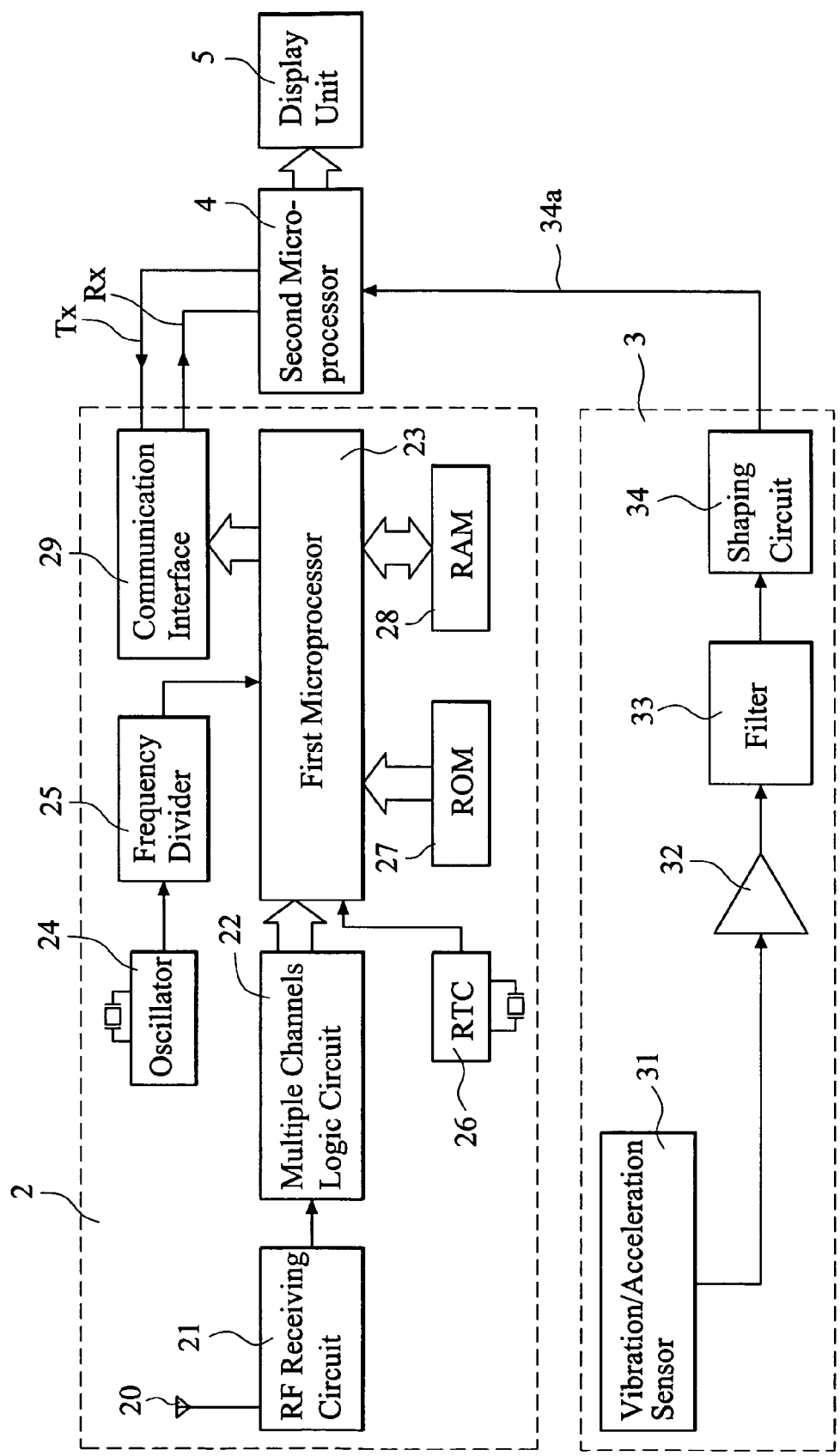
FIG. 2 is a block diagram of a circuit of the integrated exercise detection device of a first embodiment of the present invention adapted to be used in FIG. 1.

Also referring to FIG. 2, a circuit of the integrated exercise detection device of a first embodiment of the present invention adapted to be used in FIG. 1 comprises a satellite positioning module 2 and an exercise detection module 3, both of which are electrically connected to a display unit 5 that constitutes in part of the display device 102.

The satellite positioning module 2 comprises an antenna 20, an RF (radio frequency) receiving circuit 21 that is connected to the antenna 20 for receiving satellite positioning signal through the antenna 20, a multiple channels logic circuit 22 connected to the RF receiving circuit 21, a first microprocessor 23 connected to the RF receiving circuit 21 via the multiple channels logic circuit 22, an oscillator 24 providing oscillation signal to the first microprocessor 23 through a frequency divider 25, a real time control (RTC) 26 connected to the first microprocessor 23 and memory means, including read only memory (ROM) 27 and random access memory (RAM) 28, connected to the first microprocessor 23. The first microprocessor 23 is electrically connected, via a communication interface 29 and communication lines Tx and Rx, to a second microprocessor 4.

Satellite positioning signals are received by the RF receiving circuit 21 through the antenna 20 and then applied to the first microprocessor 23 through the multiple channels logic circuit 22. The satellite positioning signals are processed by the first microprocessor 23, which performs calculation based on pre-loaded algorithm to determine the current position, displacement, velocity and altitude of an exerciser. The data of current position, displacement, velocity and altitude are then transmitted by the communication interface 29 through the communication lines Tx and Rx to the second microprocessor 4 that controls the display unit 5 to display the data on the display device 102. A user or the exerciser can inspect the exercise conditions by observing the display device 102.

The exercise detection module 3 comprising a vibration/acceleration sensor 31 for detecting exercise signals, which may include for example a step counter or a velocity detector, issuing an exercise signal obtained from the exerciser. The exercise signal is amplified by an amplifier 32 and filtered by a filter 33. The amplified and filtered signal is then waveform-shaped by a shaping circuit 34 before the signal is transmitted, via an electrical wire 34*a*, to the second microprocessor 4 for display by the display unit 5.

Figure 3:
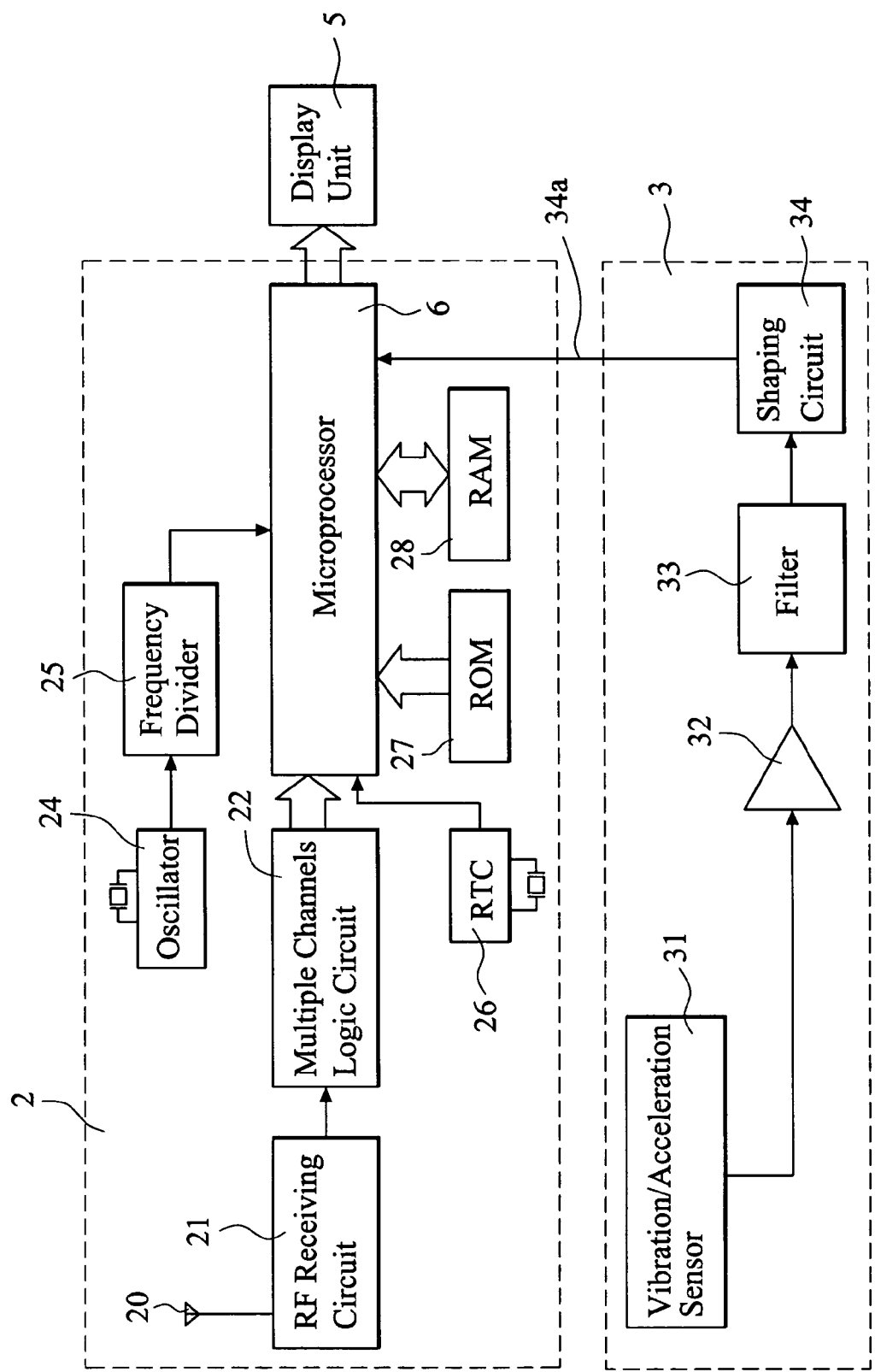
FIG. 3 is a block diagram of a circuit of the integrated exercise detection device of a second embodiment of the present invention adapted to be used in FIG. 1.

Referring to FIG. 3, a circuit of the integrated exercise detection device of a second embodiment of the present invention adapted to be used in FIG. 1 comprises a microprocessor 6 to replace with the first microprocessor 23 and the second microprocessor 4 in FIG. 2.

Similarly, satellite positioning signals are received by the RF receiving circuit 21 through the antenna 20 and then applied to the microprocessor 6 through the multiple channels logic circuit 22. The satellite positioning signals are processed by the microprocessor 6, which performs calculation based on pre-loaded algorithm to determine the current position, displacement, velocity and altitude of an exerciser. The microprocessor 6 is capable of controlling the display unit 5 to display the data on the display device 102. A user or the exerciser can inspect the exercise conditions by observing the display device 102.

The exercise detection module 3 comprising a vibration/acceleration sensor 31 for detecting exercise signals, which may include for example a step counter or a velocity detector, issuing an exercise signal obtained from the exerciser. The exercise signal is amplified by an amplifier 32 and filtered by a filter 33. The amplified and filtered signal is then waveform-shaped by a shaping circuit 34 before the signal is transmitted, via an electrical wire 34*a*, to the microprocessor 6 for display by the display unit 5.

The exercise detection module 3 detects the exercise signals that are generated by the movement and action of the exerciser during taking an exercise, such as bicycle riding and calculating data regarding speed and distance on the basis of the detected exercise signals.

Figure 4:
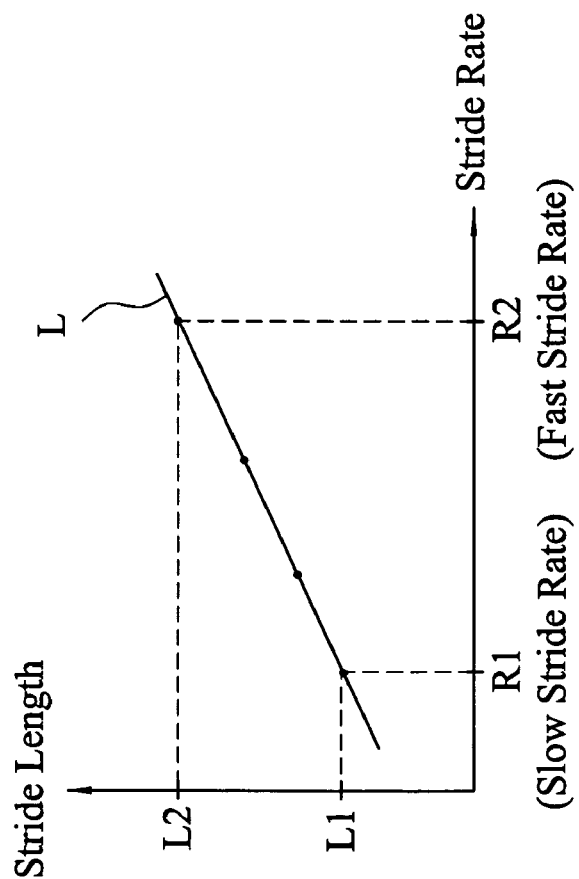
FIG. 4 is a plot of stride length vs. stride rate.

FIG. 4 is a plot of stride length vs. stride rate, which shows the relationship between the stride length and stride rate. The X-axis represents the stride rate of the user, and the Y-axis represents the stride length of the user. It is noted that a slower stride rate R1 responses to a shorter stride length L1, while a faster stride rate R2 responses to a longer stride length L2, as indicated in the plot. So, a regular curve L is obtained. According to the plot, the moving speed and distance of the user during exercising may be calculated.

In other words, the stride length changes with the change of stride rate and such change may cause error in detection and/or determination of speed and distance by the exercise detection module 3. In an aspect of the present invention, such an error can be corrected by comparison with data obtained from the satellite positioning signals that are provided by the satellite positioning receiver module 2.

The exercise detection module 3 can be of any known device, such as a speed sensor that is conventionally known, including one-dimensional (X axis), two-dimensional (X and Y axes) or three-dimensional (X, Y and Z axes) acceleration sensor.

Figure 5:
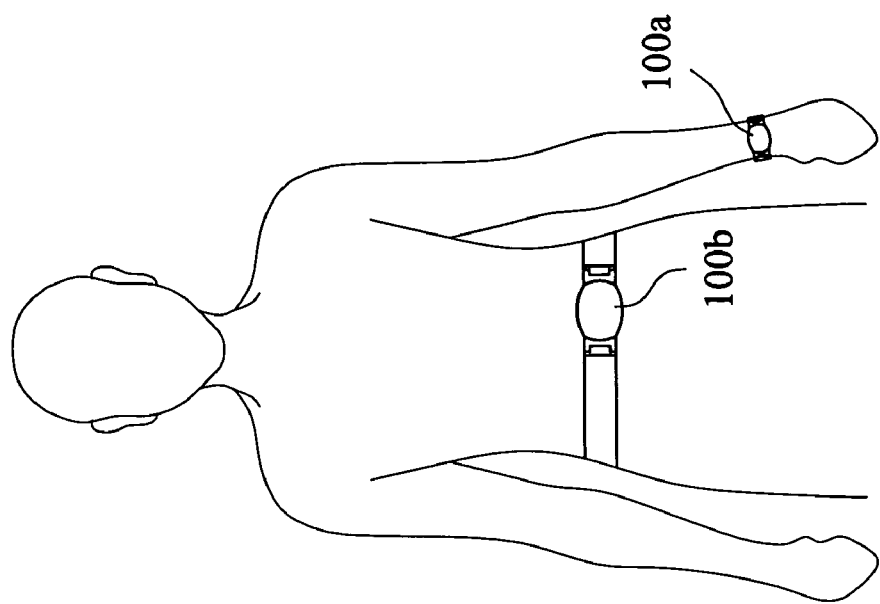
FIG. 5 is a schematic view showing a person wearing the integrated exercise detection device of the present invention.

With reference to FIG. 5, the integrated exercise detection device of the present invention can be worn on any suitable location on the body of the user. For example, the integrated exercise detection device includes a satellite positioning module 100*a* which is made in the form of a wrist watch adapted to be worn on the wrist of the use, and an exercise detection module 100*b* adapted to be simply worn on the waist of the user.

Figure 6:
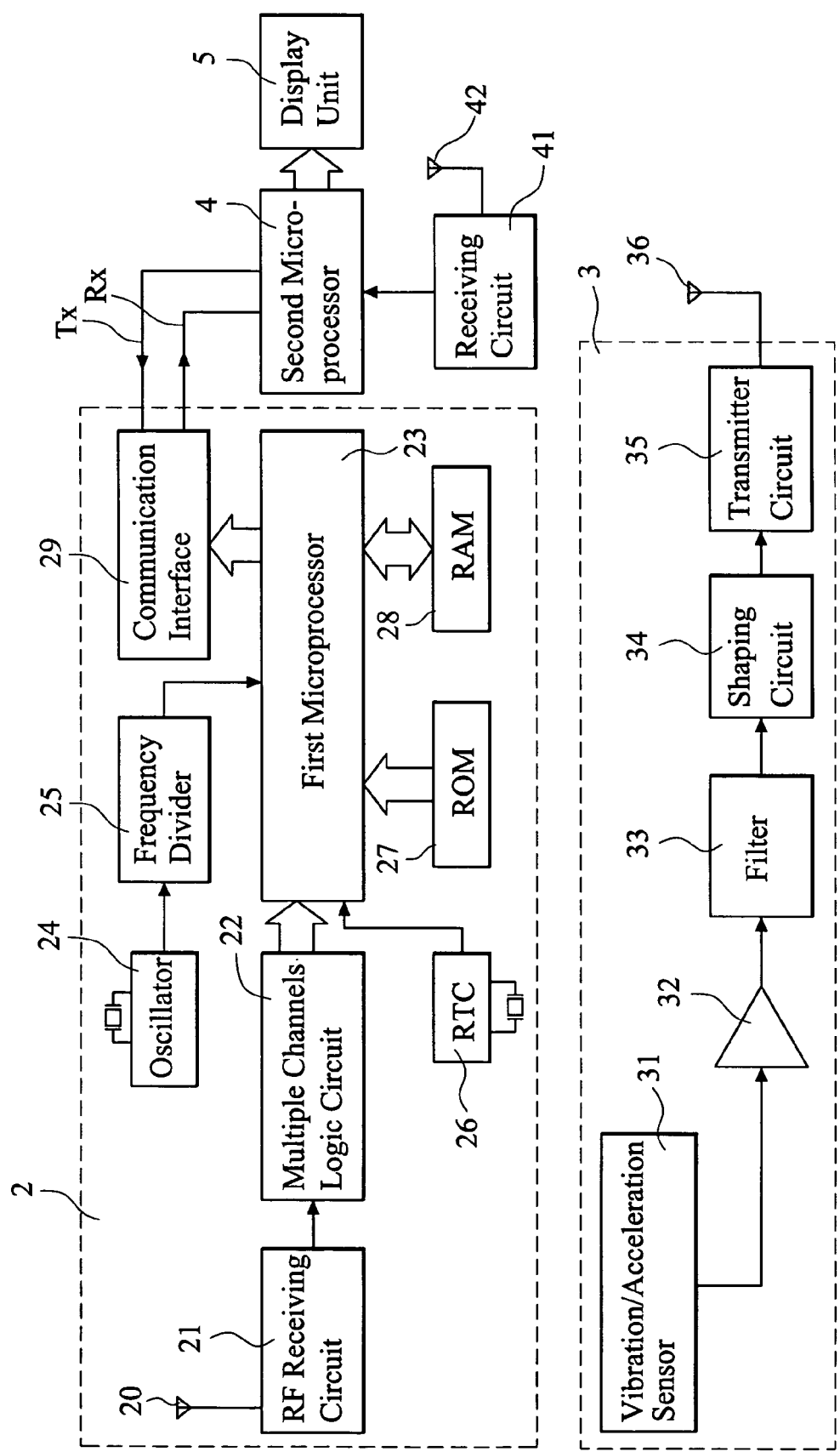
FIG. 6 is a block diagram of a circuit of the integrated exercise detection device of a third embodiment of the present invention adapted to be used in FIG. 5.

Referring to FIG. 6, which shows a third embodiment of the integrated exercise detection device in accordance with the present invention, which is adapted to be used in FIG. 5. This embodiment of the integrated exercise detection device is substantially identical to the first embodiment with reference to FIG. 2. Thus, the same components will carry the same reference numeral references and no further detail will be given herein. Instead of connection of the exercise detection module 3 to the second microprocessor 4 by an electrical cable as shown in FIG. 2, the exercise detection module 3 of the third embodiment is coupled to the second microprocessor 4 in a wireless manner. For example, the waveform-shaped exercise signals are processed by a transmitter circuit 35 for transmission in electromagnetic wave through an antenna 36. The second microprocessor 4 comprises a receiving circuit 41 that receives the exercise signals in the form electromagnetic wave through an antenna 42. The received signals are the applied to the second microprocessor 4 for display by the display unit 5.

Figure 7:
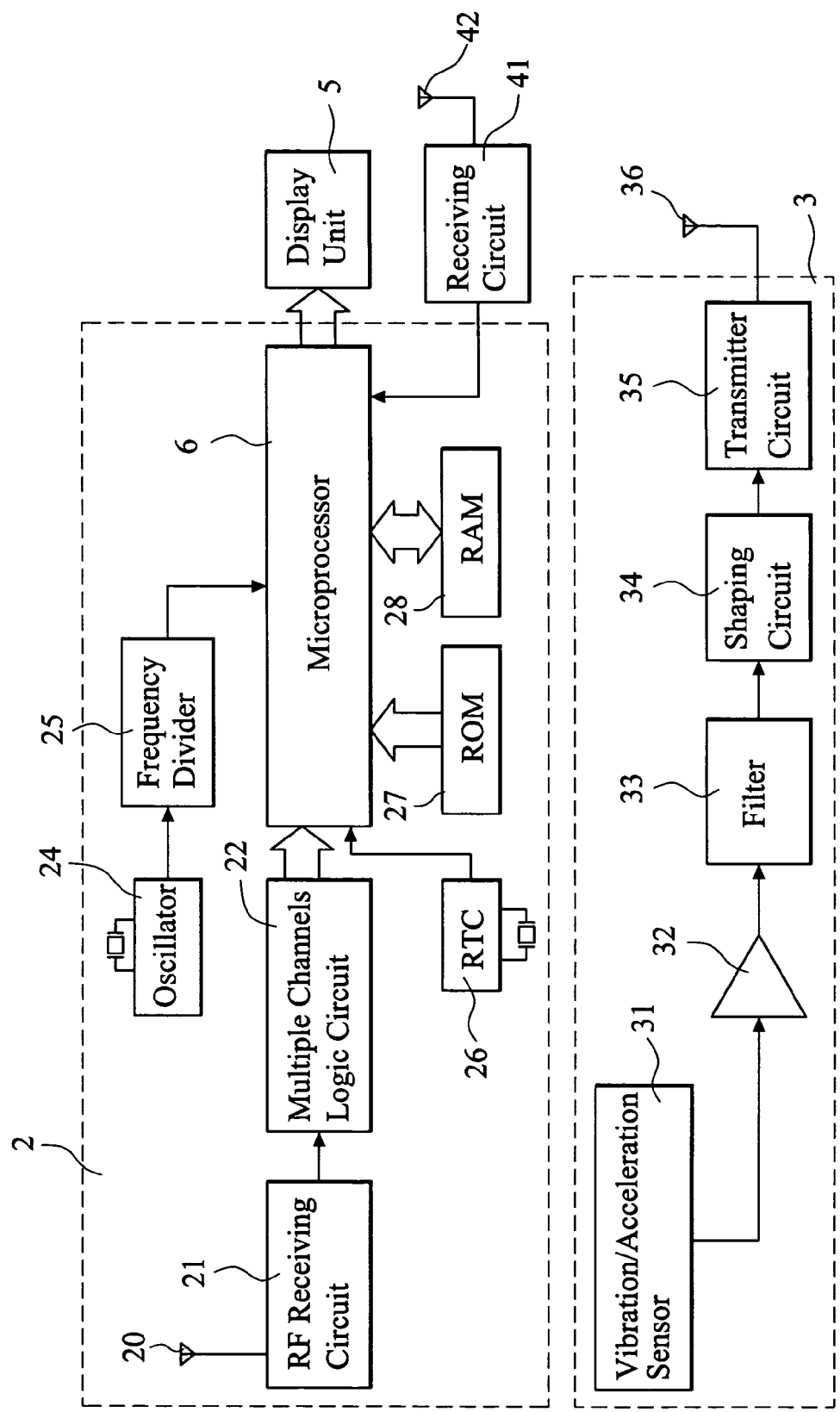
FIG. 7 is a block diagram of a circuit of the integrated exercise detection device of a fourth embodiment of the present invention adapted to be used in FIG. 5.

Referring to FIG. 7, a circuit of the integrated exercise detection device of a fourth embodiment of the present invention adapted used in FIG. 5 comprises a microprocessor 6 to replace with the first microprocessor 23 and the second microprocessor 4 in FIG. 6.

Similarly, satellite positioning signals are received by the RF receiving circuit 21 through the antenna 20 and then applied to the microprocessor 6 through the multiple channels logic circuit 22. The satellite positioning signals are processed by the microprocessor 6, which performs calculation based on pre-loaded algorithm to determine the current position, displacement, velocity and altitude of an exerciser. The microprocessor 6 is capable of controlling the display unit 5 to display the data on the display device 102. A user or the exerciser can inspect the exercise conditions by observing the display device 102.

The exercise detection module 3 comprising a vibration/acceleration sensor 31 for detecting exercise signals, which may include for example a step counter or a velocity detector, issuing an exercise signal obtained from the exerciser. The exercise signal is amplified by an amplifier 32 and filtered by a filter 33. The amplified and filtered signal is then waveform-shaped by a shaping circuit 34. The waveform-shaped exercise signals are processed by a transmitter circuit 35 for transmission in electromagnetic wave through an antenna 36. The microprocessor 6 comprises a receiving circuit 41 that receives the exercise signals in the form electromagnetic wave through an antenna 42. The received signals are the applied to the microprocessor 6 for display by the display unit 5.

Figure 8:
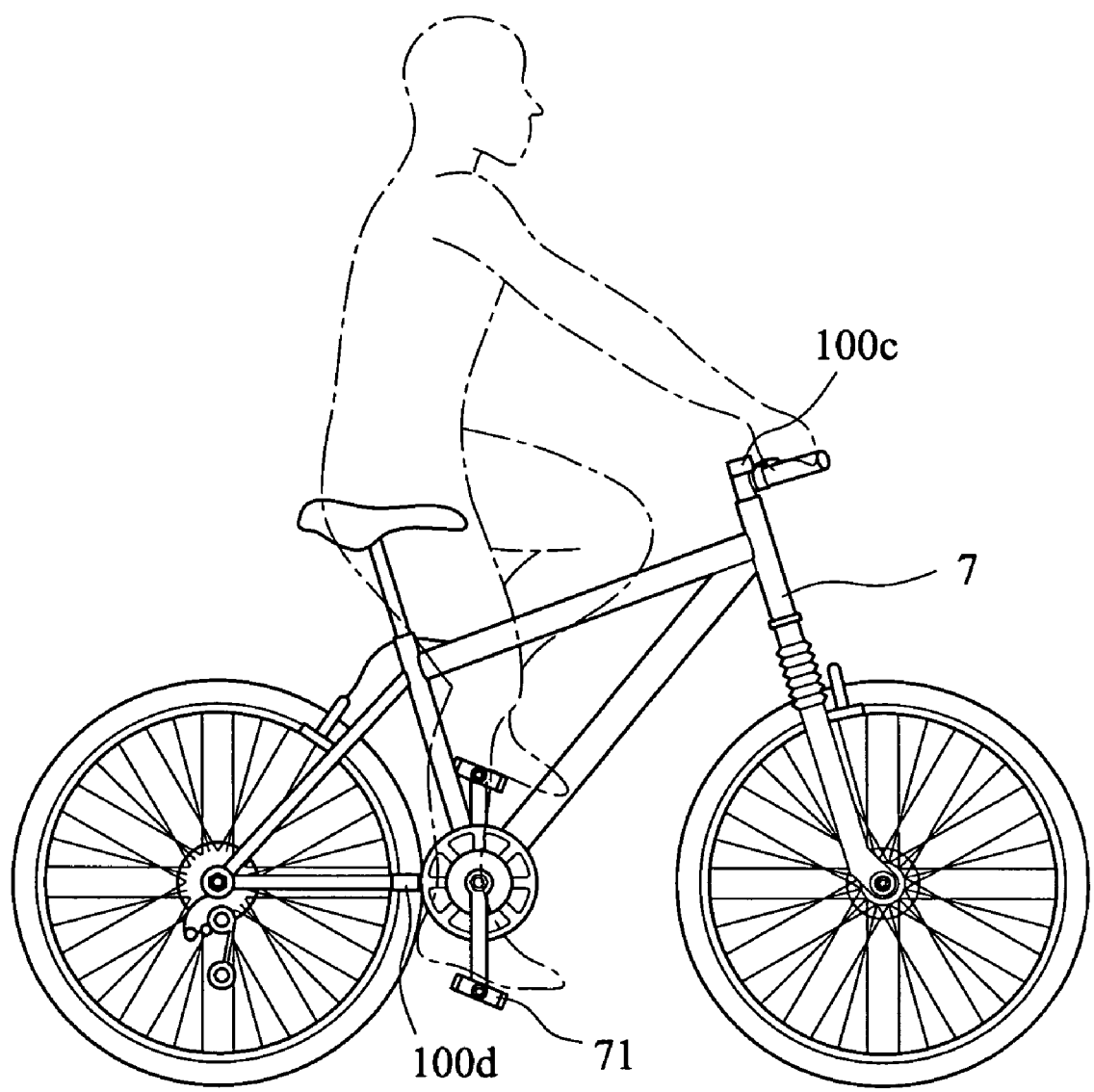
FIG. 8 shows an application of the integrated exercise detection device on outdoor bicycle riding.

The wireless connection between the exercise detection module 3 and the satellite positioning receiver module 2 allows the exercise detection module 3 to be mounted at a position remote from the satellite positioning receiver module 2. An example is shown in FIG. 8, wherein the satellite positioning receiver module 100c comprises a satellite positioning receiver module mounted to for example the handbar of a bicycle 7, while the exercise detection module comprises a velocity sensor 100d mounted to the pedal 71 of the bicycle 7 for detection of the revolution of the pedal 71.

Pedaling signal detected by the exercise detection module is applied to the second microprocessor in for example the wireless manner as shown in FIG. 6. The second microprocessor 4 perform calculation to obtain the revolution of the bicycle, which can then be converted into the speed of the bicycle. The speed of the bicycle may also be obtained from the satellite positioning signals and both speeds can be used to provide exact speed of the bicycle. For example, when the satellite signals are blocked by for example a tunnel, the speed obtained from the velocity sensor may be used alone to indicate the moving speed of the bicycle.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An integrated exercise detection device comprising:
   a satellite positioning module adapted to receive satellite signals, comprising a first microprocessor processing the satellite signals to generate first data comprising at least a current position, a first displacement, a first velocity and an altitude of a user and a communication interface;
   a second microprocessor receiving the first data transmitted through the communication interface from the first microprocessor;
   an exercise detection module adapted to detect at least one exercise signal of the user and generating second data in response thereto, the second data being transmitted to the second microprocessor, the second microprocessor processing the second data to generate at least a second velocity and a second displacement therefrom, the second microprocessor comparing the first and second displacements and the first and second velocities and correcting the second displacement and the second velocity if different from the respective first displacement and first velocity; and
   a display electrically coupled to the second microprocessor to selectively display the first and second data.

2. The integrated exercise detection device as claimed in claim 1, wherein the exercise detection module comprises a step counter.

3. The integrated exercise detection device as claimed in claim 1, wherein the exercise detection module comprises a velocity/acceleration sensor.

4. The integrated exercise detection device as claimed in claim 1, wherein the second data generated by the exercise detection module is transmitted to the second microprocessor through an electrical wire.

5. The integrated exercise detection device as claimed in claim 1, wherein the second data generated by the exercise detection module is transmitted by a wireless transmitter circuit connected to the exercise detection module and received by a wireless receiving circuit connected to the second microprocessor.

6. An integrated exercise detection device comprising:
   a satellite positioning module adapted to receive satellite signals, comprising a microprocessor processing the satellite signals to generate first data comprising at least a current position, a first displacement, a first velocity and an altitude of a user and a communication interface;
   an exercise detection module adapted to detect at least one exercise signal of the user and generating second data in response thereto, the second data being transmitted to the microprocessor, the microprocessor processing the second data to generate at least a second velocity and a second displacement therefrom, the microprocessor comparing the first and second displacements and the first and second velocities and correcting the second displacement and the second velocity if different from the respective first displacement and first velocity; and
   a display electrically coupled to the microprocessor to selectively display the first and second data.

7. The integrated exercise detection device as claimed in claim 6, wherein the exercise detection module comprises a step counter.

8. The integrated exercise detection device as claimed in claim 6, wherein the exercise detection module comprises a velocity/acceleration sensor.

9. The integrated exercise detection device as claimed in claim 6, wherein the second data generated by the exercise detection module is transmitted to the microprocessor through an electrical wire.

10. The integrated exercise detection device as claimed in claim 6, wherein the second data generated by the exercise detection module is transmitted by a wireless transmitter circuit connected to the exercise detection module and received by a wireless receiving circuit connected to the microprocessor.

* * * * *